(12) United States Patent
Tse et al.

(10) Patent No.: US 9,257,893 B2
(45) Date of Patent: Feb. 9, 2016

(54) USB POWER SUPPLY

(71) Applicant: City University Of Hong Kong, Hong Kong (HK)

(72) Inventors: Chung Fai Norman Tse, Hong Kong (HK); Shu Hung Henry Chung, Hong Kong (HK); Yau Chung John Chan, Hong Kong (HK)

(73) Assignee: CITY UNIVERSITY OF HONG KONG, KOWLOON (HK)

( * ) Notice: Subject to any disclaimer, the term of this patent is extended or adjusted under 35 U.S.C. 154(b) by 269 days.

(21) Appl. No.: 13/952,824

(22) Filed: Jul. 29, 2013

(65) Prior Publication Data

US 2015/0028824 A1      Jan. 29, 2015

(51) Int. Cl.
 G06F 1/32 (2006.01)
 H02M 1/10 (2006.01)
 H02J 1/06 (2006.01)
 G06F 1/26 (2006.01)
 H02M 3/156 (2006.01)
 H02J 7/00 (2006.01)

(52) U.S. Cl.
 CPC .................. *H02M 1/10* (2013.01); *G06F 1/266* (2013.01); *H02J 1/06* (2013.01); *H02J 7/0003* (2013.01); *H02J 2007/0001* (2013.01); *H02J 2007/0062* (2013.01); *H02M 3/156* (2013.01)

(58) Field of Classification Search
 USPC .......................................................... 713/323
 See application file for complete search history.

(56) References Cited

U.S. PATENT DOCUMENTS

| | | |
|---|---|---|
| 5,347,211 A | 9/1994 | Jakubowski |
| 5,570,002 A | 10/1996 | Castleman |
| 6,054,846 A | 4/2000 | Castleman |
| 6,362,610 B1 | 3/2002 | Yang |
| 6,628,535 B1 | 9/2003 | Wu |
| 7,122,918 B2 | 10/2006 | Rose |
| 7,377,805 B2 | 5/2008 | Kim et al. |
| 7,394,676 B2 | 7/2008 | Patel |
| 7,436,687 B2 | 10/2008 | Patel |
| 7,642,671 B2 | 1/2010 | Mahaffey |
| 8,009,451 B2 | 8/2011 | So |
| 8,149,570 B2 | 4/2012 | Keebler et al. |
| 8,193,780 B2 * | 6/2012 | Hussain et al. ............... 320/164 |
| 8,370,650 B2 * | 2/2013 | Paniagua et al. .............. 713/300 |
| 8,471,415 B1 * | 6/2013 | Heninwolf ..................... 307/140 |
| 9,030,157 B2 * | 5/2015 | Ting .............................. 320/107 |
| 2003/0085621 A1 * | 5/2003 | Potega ............................ 307/18 |
| 2005/0083615 A1 * | 4/2005 | Rose .............................. 361/18 |
| 2007/0030716 A1 * | 2/2007 | Manolescu ...................... 363/84 |

(Continued)

*Primary Examiner* — Vincent Tran
(74) *Attorney, Agent, or Firm* — Ware, Fressola, Maguire & Barber LLP

(57) ABSTRACT

A universal serial bus (USB) power supply is disclosed as including a main body (12) and a cable (24) releasably connectable with each other, the main body (12) being releasably connectable to a direct current (DC) power source and having a USB receptacle (20) electrically connectable with the DC power source. The cable (24) includes a USB plug (26) releasably connectable with the USB receptacle (20) to establish electrical connection and data communication there-between and a connector (30) electrically connected with the USB plug (26). The power supply is operable in a detached mode in which the main body (12) is out of connection with the cable (24) and in an attached mode in which the main body (12) is releasably connected with the cable (24). The power supply is adapted, when in the attached mode, to automatically change the voltage of a DC power output from the connector (30).

15 Claims, 3 Drawing Sheets

(56) References Cited

U.S. PATENT DOCUMENTS

| | | | |
|---|---|---|---|
| 2008/0088177 A1* | 4/2008 | Patel | 307/12 |
| 2010/0064148 A1* | 3/2010 | Ho et al. | 713/300 |
| 2010/0219790 A1* | 9/2010 | Chadbourne et al. | 320/107 |
| 2012/0119693 A1* | 5/2012 | Purdy et al. | 320/106 |
| 2012/0210146 A1* | 8/2012 | Lai et al. | 713/310 |

* cited by examiner

USB POWER SUPPLY

TECHNICAL FIELD

This invention relates to a universal serial bus (USB) power supply, in particular, to a power supply having automatic supply voltage regulation which is suitable, but not exclusively, for charging and/or powering electrical and/or electronic equipment requiring a direct current (DC) supply of different voltages.

BACKGROUND OF THE INVENTION

Mobile electronic gadgets (such as smart phones, tablets, and laptop computers) are very popular nowadays. These mobile devices provide us with much convenience in communicating with others and accessing online information. Nonetheless, these mobile devices rely on batteries for power storage and normally last only a few hours.

For charging smart phones, tablets and other portable DC-powered loads, detection of supply voltage is not necessary as all these devices are rated at 5 V DC. The universal serial bus (USB) power supply would provide the required charging recognition handshake for smart phones and tablets.

On the other hand, there is no harmonized standard for laptop computer power supply voltage. Laptop computers found in the market have voltage inputs ranging from 9V DC to 20V DC, even though their internal hardware are highly similar. Power supply units for laptop computers are usually incompatible with one another, and laptop computers therefore always come with a dedicated direct current (DC) power supply for battery charging. The output voltage of these dedicated power supplies for laptop computers of different brands and models are different. Therefore, all laptop computers have to be powered/charged by their dedicated power supplies.

With the limited battery storage capacity, dedicated power supply needs to be carried along with the mobile gadget. Depending on the design, their weights range from 0.3 kg to 0.5 kg, and the power density ranges from 6 to 10 W/in$^3$. That adds to the overall burden of carrying the mobile gadgets. Furthermore, the dedicated power supply itself becomes an unnecessary electronic wastage once the laptop computer is abandoned. Although there are available in the market universal power supplies for laptop computers, such require users to manually select the desired output voltage, which is both troublesome and prone to errors.

It is thus an object of the present invention to provide a USB power supply in which the aforesaid shortcomings are mitigated or at least to provide a useful alternative to the trade and public.

SUMMARY OF THE INVENTION

According to the present invention, there is provided a universal serial bus (USB) power supply including a first unit, and a second unit releasably connectable with said first unit, wherein said first unit is releasably connectable to a direct current (DC) power source for receiving a DC power therefrom, said first unit including a first USB connection part electrically connectable with said DC power source, wherein said second unit includes a second USB connection part releasably connectable with said first USB connection part to establish electrical connection and data communication therebetween and a connector electrically connected with said second USB connection part, wherein said power supply is operable in a detached mode in which said first unit is out of connection with said second unit and in an attached mode in which said first unit is releasably connected with said second unit, and wherein, when in said attached mode, said power supply is adapted to automatically change the voltage of a DC power output from said connector.

BRIEF DESCRIPTION OF THE DRAWINGS

An embodiment of the present invention will now be described, by way of example only, with reference to the accompanying drawings, in which.

DETAILED DESCRIPTION OF THE PREFERRED EMBODIMENT

Figure 1:
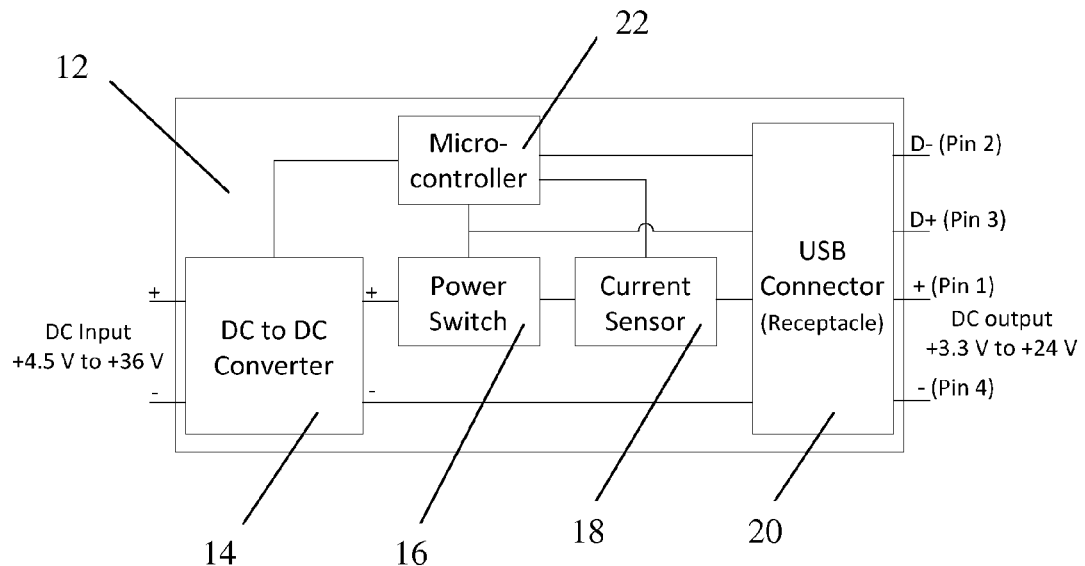
FIG. 1 is a schematic block diagram of a main body of a universal serial bus (USB) power supply according to an embodiment of the present invention.

Referring firstly to FIG. 1, such shows a schematic block diagram of a main body (12) of a universal serial bus (USB) power supply according to an embodiment of the present invention. The main body (12) houses a DC to DC converter (14) electrically connected with a power switch (16), which is in turn electrically connected with a current sensor (18), which is in turn electrically connected with a USB receptacle (20). In addition, a—connection point of the DC to DC converter (14) is electrically connected with the USB receptacle (20). The USB receptacle (20) is also electrically connected with the power switch (16). A microcontroller (22) is electrically connected with the DC to DC converter (14), the power switch (16), the current sensor (18) and the USB receptacle (20), to control operation of the main body (12) and, in fact, the whole USB power supply.

Figure 2:
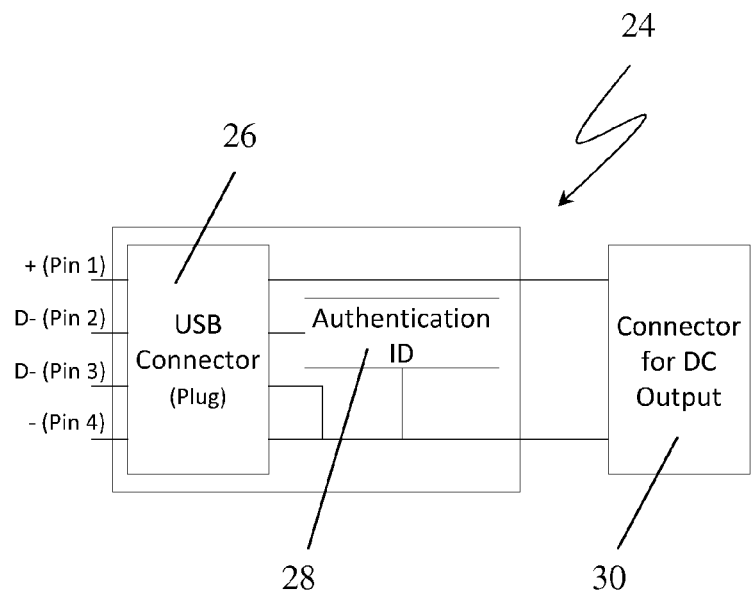
FIG. 2 is a schematic block diagram of a custom-made cable releasably connectable with the main body of FIG. 1.

Turning to FIG. 2, such shows a schematic block diagram of a custom-made cable, generally designated as (24), releasably connectable with the main body (12) for establishing electrical and physical connection therewith. The cable (24) includes a USB plug (26), a memory (28), such as an electrically erasable programmable read-only memory (EEPROM), for storing an authentication identifier (ID) and a connector (30).

The USB plug (26) of the cable (24) is releasably connectable with the USB receptacle (20) of the main body (12) physically and electrically to establish physical and electrical connection between the USB plug (26) and the USB receptacle (20), so as to establish electrical connection, physical connection and data communication between the main body (12) and the cable (24).

The USB power supply according to the present invention may operate in two modes, namely a detached mode and an attached mode. In the detached mode, the main body (12) and the cable (24) are out of connection with each other. In this detached mode, when the main body (12) is connected with a DC power source, the USB receptacle (20) is connectable with a complementary USB plug of an electronic equipment (such as a smart phone or a tablet) for powering and/or charging the electronic equipment. In the attached mode, the main body (12) and the cable (24) are connected with each other via connection of the USB plug (26) and the USB receptacle (20). In the attached mode, when the main body (12) is connected with a DC power source, the connector (30) is connectable with a complementary connection portion of an electronic equipment (such as a laptop computer) for powering and/or charging the electronic equipment.

Each custom-made cable (24) has an authentication identifier (ID) stored in its memory (28), which, when the cable (24) is connected with the main body (12), can be read by the microcontroller (22) through the D− (Pin 2) of the USB plug (26) and that of the USB receptacle (20) of the main body (12) for identification purposes.

Figure 3:
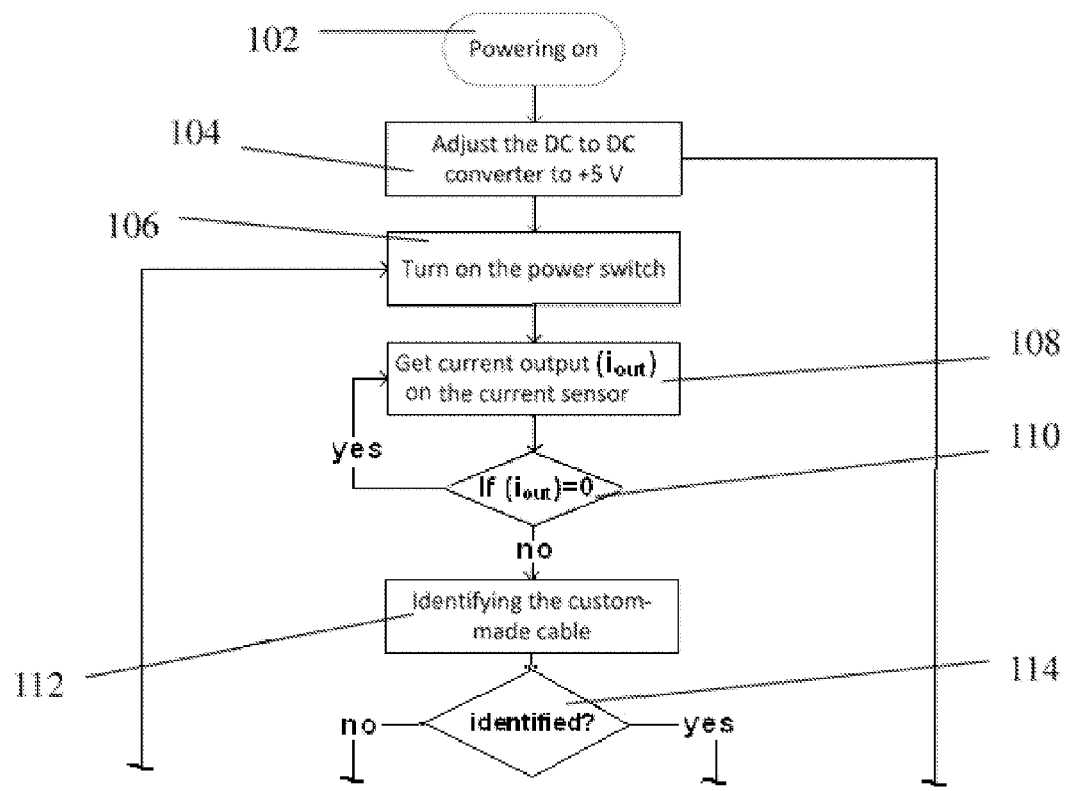
FIG. 3 is a flow chart showing the steps of operation of the USB power supply according to the present invention.
Figure 3:
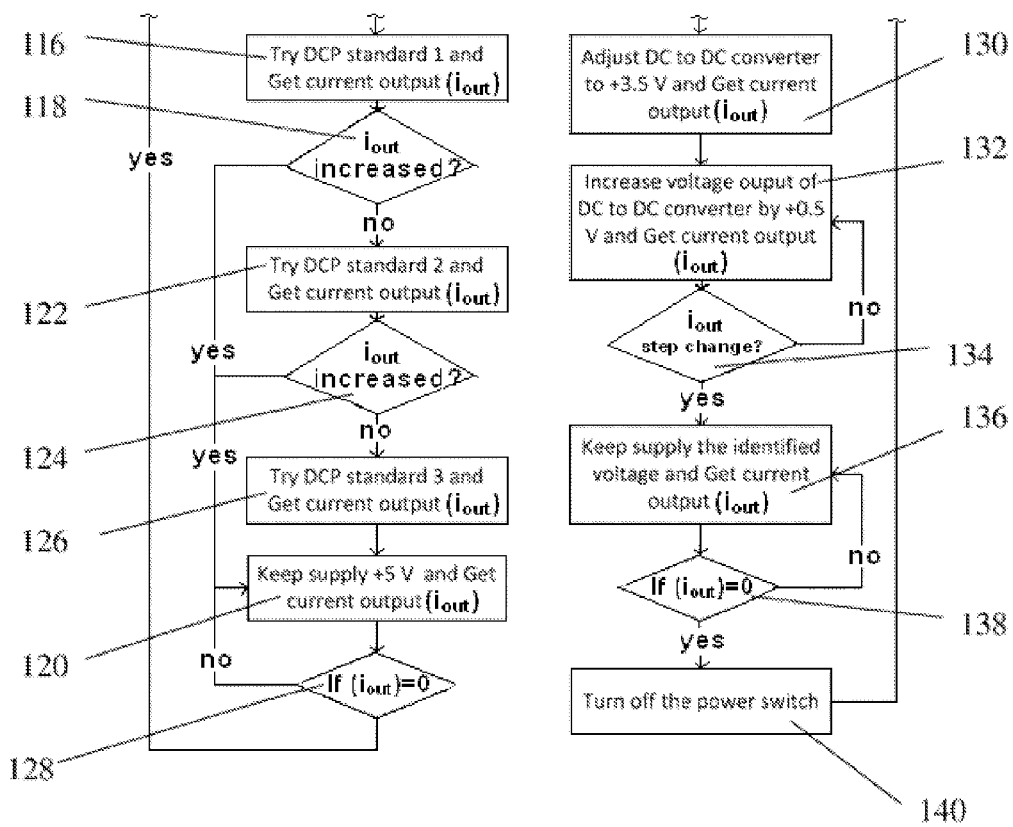

The operation of the USB power supply according to the present invention will be further described with reference to the flowchart of FIG. 3. When the USB power supply is at an ON state (Step 102) and a DC power source (e.g. with a +12V DC) is connected with the main body (12), the DC to DC converter (14) receives a DC power from the DC power source for subsequent adjustment. In particular, the microcontroller (22) automatically causes the DC to DC converter (14) to output a DC power source at a voltage of +5V DC (Step 104), and turns on the power switch (16) (Step 106) to enable DC output. The microcontroller (22) then continuously monitors (Step 108), through the current sensor (18), the electric current output ($i_{out}$) on the USB receptacle (20), in particular to detect whether $i_{out}$ is zero (Step 110). If $i_{out}$ is zero, it means that no electronic device is electrically connected to the USB power supply, and the microcontroller (22) continues to monitor the $i_{out}$.

If $i_{out}$ is not zero, it signifies that an electronic device is electrically connected to the USB power supply and is drawing an electric current from the USB power supply. The USB power supply then automatically executes an intelligent load-type detection algorithm, which starts with identifying the presence or otherwise of the custom-made cable (24) (Step 112; Step 114). If the custom-made cable (24) is not identified (i.e. the microcontroller (12) fails to read any valid identification ID), it signifies that the cable (24) is not connected with the main body (12), in which case the USB power supply operates in the detached mode, and acts as a dedicated charging port (DCP) for certain electronic equipment, such as smart phones and tablets.

As an example, the USB power supply is able to integrate three common DCP standards. Table 1 below shows the supported DCP standards and output signals on D− (Pin 2) and D+ (Pin 3) of the USB receptacle (20):

TABLE 1

| DCP Standard | Signal Output on D− (Pin 2) | Signal Output D+ (Pin 3) |
| --- | --- | --- |
| Standard 1 | 2.0 V | 2.8 V |
| Standard 2 | Shorted to D+ | Shorted to D− |
| Standard 3 | 1.2 V | 1.2 V |

If the custom-made cable (24) is not identified, the microcontroller (22) first changes the signal output on D− (Pin 2) and D+ (Pin 3) according to DCP Standard 1 and the current sensor 18 continues to detect and analyze the $i_{out}$ (Step 116). If there is an increase in $i_{out}$ (Step 118), it means that DCP Standard 1 can be used for activating fast charging on the connected electronic equipment, in which case the USB power supply continues to supply +5V DC to the connected electronic with DCP Standard 1 and to detect the $i_{out}$ (Step 120). If there is no increase in $i_{out}$ (Step 118), the microcontroller (22) then changes the signal output on D− (Pin 2) and D+ (Pin 3) according to DCP Standard 2 and the current sensor (18) continues to detect and analyze the $i_{out}$ (Step 122). If there is an increase in $i_{out}$ (Step 124), it means that DCP Standard 2 can be used for activating fast charging on the connected electronic equipment, in which case the USB power supply continues to supply +5V DC to the connected electronic with DCP Standard 2 and to detect the $i_{out}$ (Step 120). If there is no increase in $i_{out}$ (Step 124), the microcontroller (22) then changes the signal output on D− (Pin 2) and D+ (Pin 3) according to DCP Standard 3 and the current sensor (18) detects and analyzes the $i_{out}$ (Step 126), and the USB power supply continues to supply +5V DC to the connected electronic with DCP Standard 3 and to detect the $i_{out}$ (Step 120). The USB power supply continues to output a +5V DC power through the connector (30) to the connected electronic equipment so long as the microcontroller (22) detects, through the current sensor (18), that $i_{out}$ is not zero (Step 128).

It can be seen that, in the detached mode, i.e. when the custom-made cable (24) is not connected with the main body (12), the voltage output through the USB receptacle (20) of the main body (12) is always +5V DC, which is the same voltage output as a conventional USB power supply.

If the custom-made cable (24) is detected and identified by the microcontroller (22) of the main body (12) (Step 114), the USB power supply then automatically executes an intelligent load-type detection and voltage regulation algorithm. As a first step of this intelligent load-type detection and voltage regulation algorithm, the microcontroller (22) first adjusts the DC to DC converter (14) to output a +3.5V output and detects, through the current sensor (18), the electric current output ($i_{out}$) on the USB receptacle (20) (Step 130). The voltage output from the DC to DC converter (14) increases by equals steps of a pre-determined voltage (e.g. 0.5V) while the current sensor (18) continues to detect and analyze $i_{out}$ (Step 132) to check whether there is a step change of $i_{out}$ (Step 134). If there is no step change of $i_{out}$, the voltage output from the DC to DC converter (14) increases by another 0.5V. This process continues until there is a step change of $i_{out}$ or when the maximum allowed output voltage of the DC to DC converter (14) is reached. When a step change of $i_{out}$ is detected by the current sensor (18), it signifies that the output voltage of the DC to DC converter (14) at which the step change of $i_{out}$ is detected matches or substantially matches the (or the initial) operation voltage of the electronic equipment (e.g. a laptop computer) connected with the USB power supply.

The USB power supply keeps on supplying DC power to the electronic equipment through the connector (30) at the voltage (Step 136) at which the step change of $i_{out}$ is detected by the current sensor (16). The current sensor (18) continues to detect the $i_{out}$. If the $i_{out}$ falls to zero (Step 138), the power switch (16) will be turned off (Step 140).

In particular, for protecting electronic equipment (such as smart phones and tablets) which may be charged and/or powered by ordinary USB power supply from overvoltage damage, the cable (24) is designed to provide control signals to the main body (12). If the cable (24) is detached from the main body (12), the microcontroller (22) fails to receive such control signals from the cable (24), whereupon the microcontroller (22) automatically and immediately turns off the power switch (16) to turn off the voltage output from the USB receptacle (20) until the microcontroller (22) adjusts the voltage output from the DC to DC converter (14) to +5V DC, i.e. the pre-determined voltage at which the USB power supply outputs DC power source when in the detached mode, whereupon the microcontroller (22) turns on the power switch (16) again to allow voltage output.

As an example, in a USB power supply according to the present invention implemented for application in automobiles, the USB power supply accepts voltage input from +4.5V DC to +36V DC, which is able to support most common voltage outputs (e.g. +12V DC) in vehicles. With the DC to DC converter (14), this USB power supply can regulate its voltage output from +3.3V DC to +24V DC with 5 A and 8 A maximum current output in boost and buck mode respectively. Thus, the maximum power of the USB power supply is 120 W and 192 W in boost and buck mode respectively.

It can be seen that the USB power supply of the present invention can charge and/or power a large number of electronic equipment at different operation voltages. When in the detached mode, the main body (12) acts as a stand-alone power supply to supply DC output at a pre-determined voltage. When in the attached mode, the USB power supply (comprising the main body (12) and the cable (24)) can supply DC output which automatically matches the operation voltage of the electronic equipment connected with it. The regulation and adaptation of voltage output from the USB power supply according to the present invention (whether in the detached mode, in the attached mode, or upon change of an operation mode) is automatic in the sense that no user operation is required.

Although a USB power supply according to the present invention has thus far been described as being suitable for powering and/or charging active electronic equipment, it should be understood that such a USB power supply is suitable for powering and/or charging both active and passive DC loads/equipment, including, but not limited to, such electrical equipment as USB fans and reading lights.

It should also be understood that the USB power supply firmware according to the present invention can be upgraded via the USB plug (26) of the cable (24). In particular, the memory (28) (which may be an EEPROM) in the cable (24) is stored with data for operation of the intelligent load-type detection and voltage regulation algorithm. The memory (24) can be easily reconfigured (such as by changing the data stored in the memory (28), adding data to the memory (28) and/or removing data from the memory (28)) to cater for new mobile electronic and/or electrical equipment with further different DC output requirements.

It should be understood that the above only illustrates an example whereby the present invention may be carried out, and that various modifications and/or alterations may be made thereto without departing from the spirit of the invention. It should also be understood that various features of the invention which are, for brevity, described here in the context of a single embodiment, may also be provided separately or in any appropriate sub-combinations.

The invention claimed is:

1. A universal serial bus (USB) power supply including:
a first unit, and
a second unit releasably connectable with said first unit,
wherein said first unit is releasably connectable to a direct current (DC) power source for receiving a DC power there-from, said first unit including a first USB connection part electrically connectable with said DC power source,
wherein said second unit includes a second USB connection part releasably connectable with said first USB connection part to establish electrical connection and data communication there-between and a connector electrically connected with said second USB connection part,
wherein said power supply is operable in a detached mode in which said first unit is out of connection with said second unit and in an attached mode in which said first unit is releasably connected with said second unit,
wherein, when in said attached mode, said power supply is adapted to automatically change the voltage of a DC power output from said connector,
wherein said power supply includes a current sensor which, when said power supply is in said attached mode, is adapted to detect electricity current output from said first USB connection part,
wherein said first unit includes a converter adapted to change the voltage of a DC power received from said DC power source for output, and
wherein, when said power supply is in said attached mode, and during detection by said current sensor of said electricity current output from said first USB connection part, said converter is adapted to first output a DC power at a first pre-determined voltage and to increase the voltage of DC power outputted thereby from said first pre-determined voltage until said current sensor senses a step change of the electric current output from said first USB connection part, whereupon said converter is adapted to continue to output a DC power at the voltage at which said step change of the electric current output from said first USB connection part is detected.

2. The power supply according to claim 1 wherein, when in said attached mode, said power supply is adapted to automatically change the voltage of said DC output from said connector to match or substantially match the operation voltage of an electrical and/or electronic equipment electrically connected with said connector.

3. The power supply of claim 2 wherein said second unit includes an authentication identifier which, when said power supply is in said attached mode, is readable by said first unit for identification of said second unit.

4. The power supply of claim 3 wherein, when said power supply is in said attached mode, said power supply is adapted to automatically change the voltage of said DC output from said connector to match or substantially match the operation voltage of said electrical and/or electronic equipment electrically connected with said connector only if said second unit is identified by said first unit.

5. The power supply of claim 3 wherein said authentication identifier of said second unit is readable by said first unit through a D− (Pin 2) of said first USB connection part.

6. The power supply of claim 1 wherein said first USB connection part is a USB receptacle and said second USB connection part is a USB plug.

7. The power supply of claim 1 wherein, when said power supply is in said detached mode, said converter is adapted to change the voltage of said DC power received from said DC power source to a second pre-determined voltage for output.

8. The power supply of claim 7 wherein, when said power supply is in said attached mode, said converter is adapted to change the voltage of said DC power received from said DC power source to a third voltage which is different from said second pre-determined voltage.

9. The power supply of claim 7 wherein, upon change of said power supply from said attached mode to said detached mode, said first unit is adapted to automatically change the DC power output from said converter to said second pre-determined voltage.

10. The power supply of claim 1 wherein said first unit includes said current sensor.

11. The power supply of claim 1 wherein, when said power supply is in said attached mode, said converter is adapted to increase the voltage of DC power outputted thereby in steps of substantially equal voltage.

12. The power supply of claim 1 wherein said first unit includes a microcontroller for controlling operation of said power supply.

13. The power supply of claim 1 wherein, when said power supply is in said detached mode, said first unit is adapted to be connected with an electrical and/or electronic equipment via said first USB connection part to charge and/or power said electrical and/or electronic equipment with a plurality of dedicated charging port standards.

14. The power supply of claim 1 wherein said second unit includes a cable.

15. The power supply of claim 1 wherein said second unit includes a memory for storing data allowing, when said power supply is in said attached mode, automatic changing of the voltage of a DC power output from said connector, and wherein said data in said memory are reconfigurable via said second USB connection part of said second unit.

* * * * *